Dec. 9, 1969         D. ERBEN         3,483,374
APPARATUS FOR THE SURFACE TREATMENT OF WORKPIECES
BY ELECTRICAL DISCHARGES
Filed Jan. 23, 1967                    4 Sheets-Sheet 1
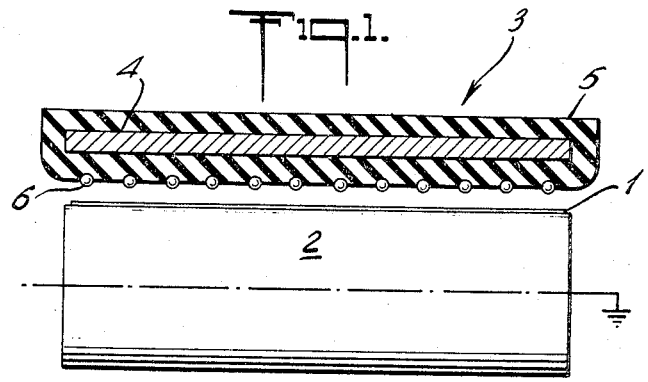
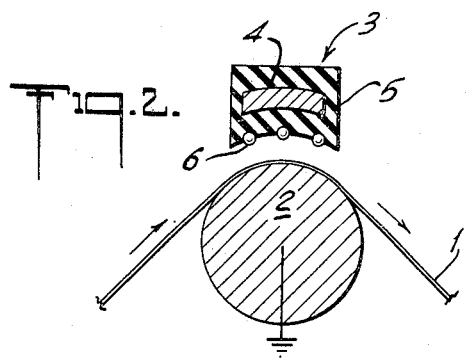
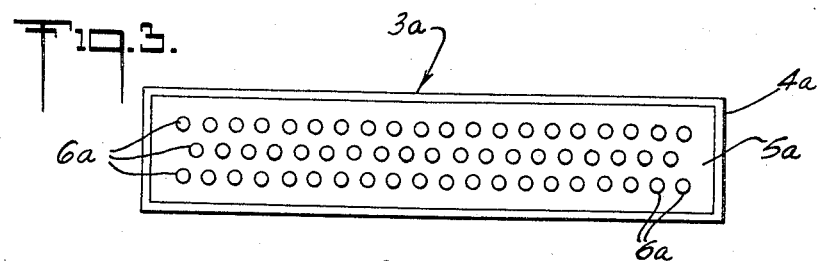
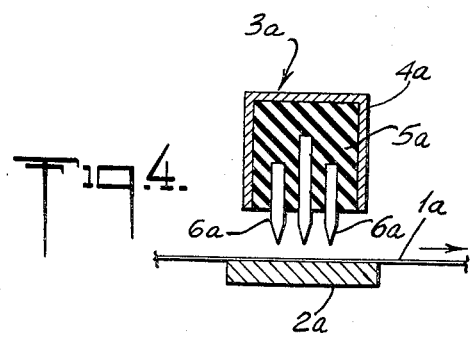
INVENTOR:
DIETRICH ERBEN
BY
Morrison, Kennedy & Campbell
ATTORNEYS.

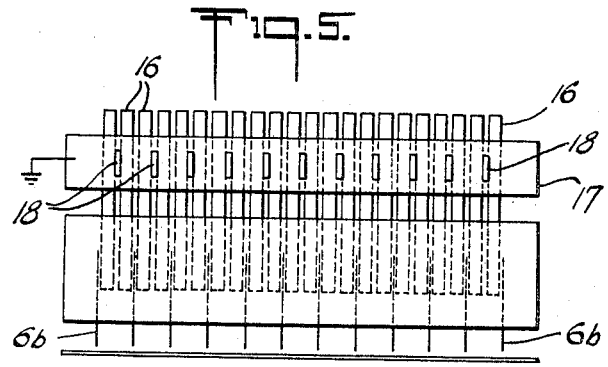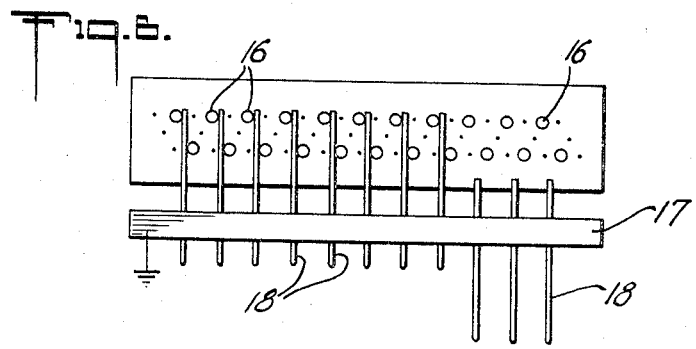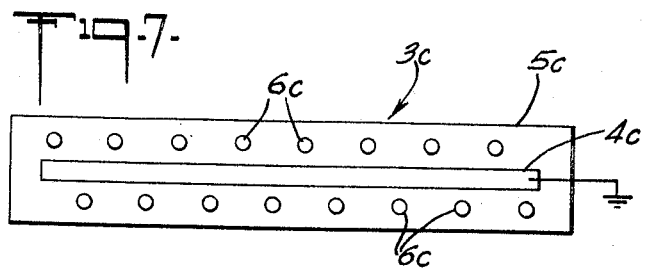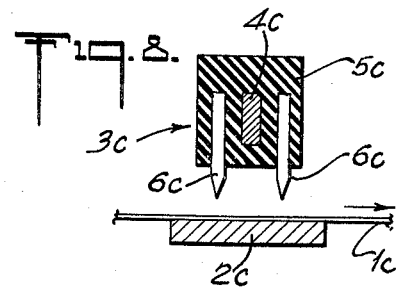

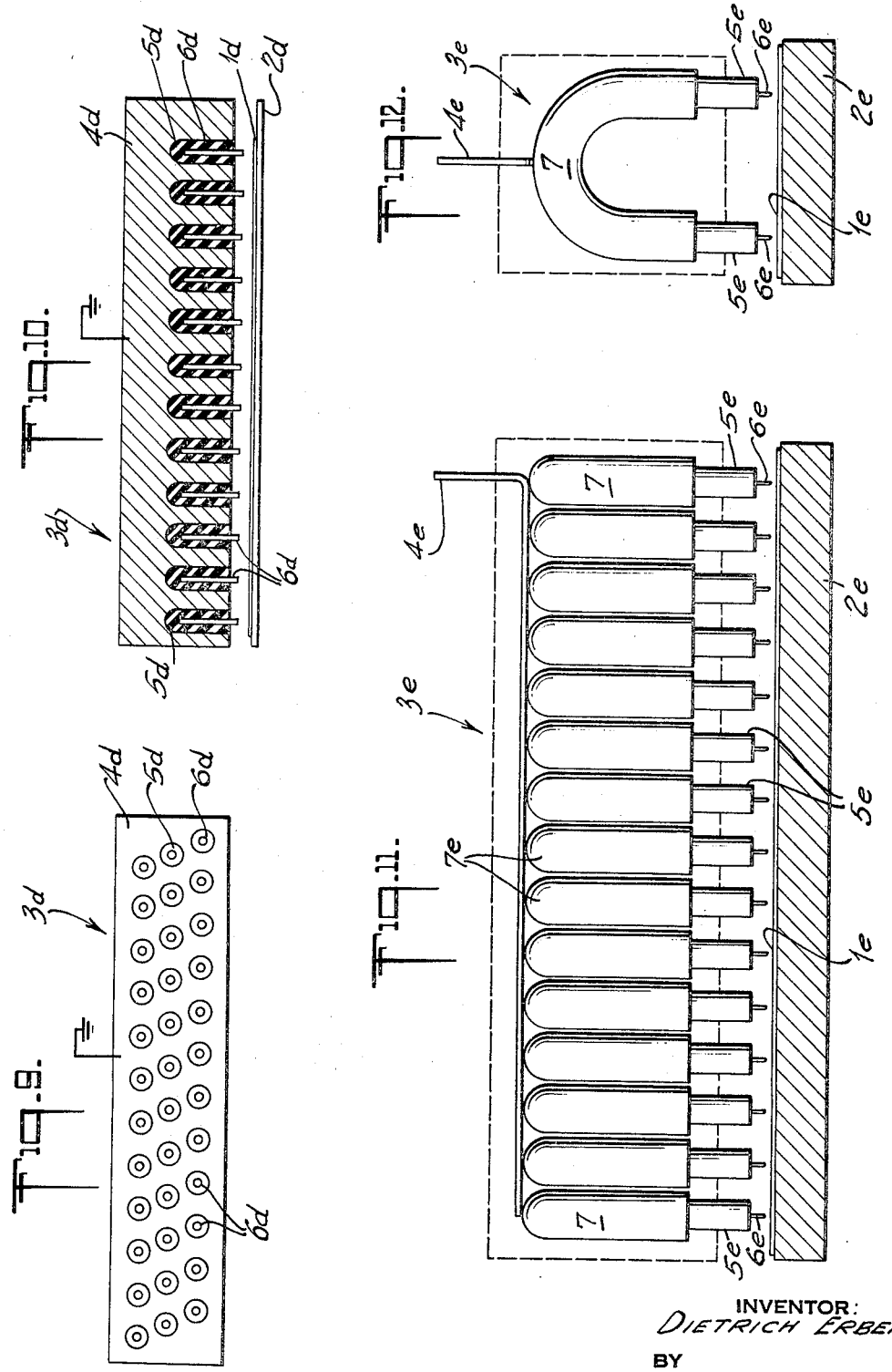

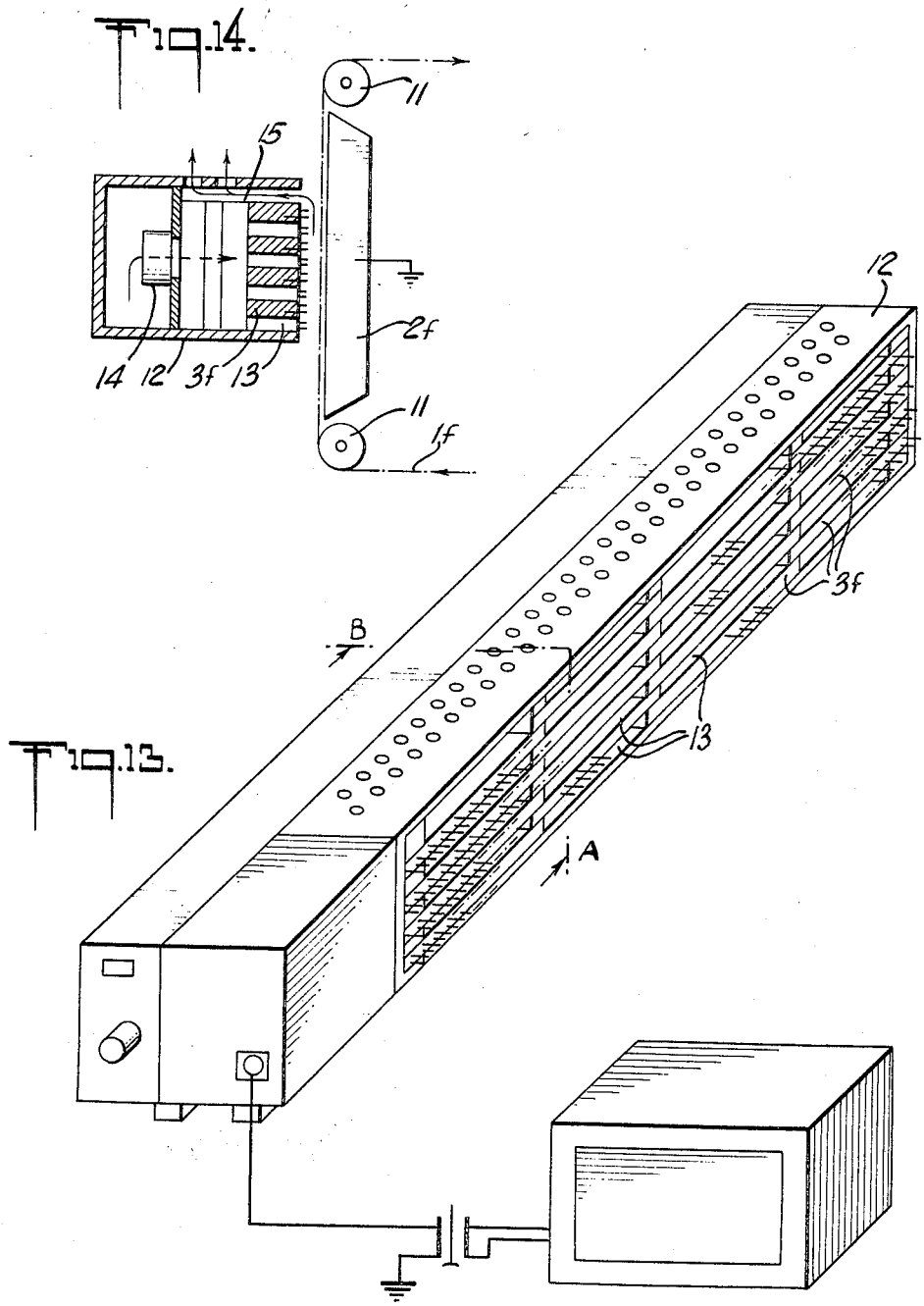

United States Patent Office 3,483,374
Patented Dec. 9, 1969

3,483,374
APPARATUS FOR THE SURFACE TREATMENT OF WORKPIECES BY ELECTRICAL DISCHARGES
Dietrich Erben, Aystetten, Germany, assignor to Swiss Aluminium Ltd., Chippis, Switzerland, a joint-stock company of Switzerland
Filed Jan. 23, 1967, Ser. No. 610,934
Claims priority, applications Germany, Jan. 24, 1966, E 30,925 and E 30,940. Austria, Apr. 5, 1966, A 3,220/66
Int. Cl. H01j 37/26
U.S. Cl. 250—49.5                          2 Claims

ABSTRACT OF THE DISCLOSURE

Apparatus for the surface treatment of workpieces, especially of strips or foils from plastic or metal, by electrical discharges between two electrodes each one being connected to a terminal of an alternating voltage generator. One electrode is arranged at a distance from the surface to be treated and has a coating of a solid dielectric material stabilizing the discharges. Numerous conducting elements are embedded in the dielectric coating at the side facing the surface to be treated. These conducting elements have no conducting contact either with each other or with the electrode; from their ends which are directed towards the surface to be treated, the discharges are issued.

The prior art

The surfaces of several plastic materials such as polyethylene, polypropylene, polystyrene have to undergo preliminary treatment before they are able to be printed, laminated, lacquered or combined in another manner with materials of different composition. This also applies to metallic surfaces, especially to aluminum foil intended for packaging purposes. A known method of such preliminary treatment consists of subjecting the surface to high voltage which produces a corona discharge. For the carrying out of this method with plastic or metal foil, two large-surfaced electrodes are provided to which a high voltage is applied. With one of these electrodes the foil is in direct contact, while the second is placed apart from the foil and has at the side facing the foil surface to be treated, a dielectric coating which prevents a total electrical discharge between the electrodes. This dielectric coating is of absolute necessity in order to prevent the corona from developing a total discharge which would be directed only to an unpredestinable spot of the surface to be treated. The disadvantage of this method in common practice is that the corona acts not only on the surface to be treated but with destructive effect on the dielectric as well and that the intensity of the treatment cannot be increased as desired so that the speed of the process of treating foil is limited.

The invention

The invention relates to an apparatus for the surface treatment of workpieces, especially foil, strip and plate by means of electrical discharge between two electrodes, each connected to a terminal of an alternating voltage generator; one of these electrodes which is spaced from the surface to be treated having a discharge stabilizing coating made from solid dielectric material.

The apparatus according to the invention is characterized by the fact that numerous conducting elements are embedded in the dielectric coating at the side facing the surface to be treated, these connecting elements having no conducting contact, neither with each other nor with the electrodes and having ends directed towards the surface to be treated wherefrom the discharges are issued.

Advantages

Through the capacitive coupling of every single conducting element to the electrode, the element receives an alternating voltage potential which causes a discharge issuing from the free end of the element which faces the surface to be treated. At every pulse of the voltage each single conducting element is able to discharge without influencing the discharge of any neighbouring element. A short circuit between a single element and the opposing electrode (the latter being preferably earthed) caused by soiling, moisture, or a hole in the workpiece, does not in any way influence the periodical discharges of the neighbouring elements.

This arrangement causes the electrical discharge issuing from the surface of the dielectric coating to be directed to a large suitable determined number of spots which are preferably arranged at equal distance from each other. For practical application on an industrial scale, this arrangement offers the following significant advantages: the spots from where the discharges are issued, and which are particularly subject to wear, can be manufactured from a wear-resistant material, e.g. alloyed steel. The dielectric coating in this case is stressed only by the dielectric flux but not by the convective flux of ions or electrons. When high voltage is applied, as is necessary in the treatment of thick slabs of plastic material, or in order to sustain a vigorous discharge current as required in the treatment of metallic surfaces, a coating of dielectric material applied only on the electrode, does not however grant a discharge which would be homogeneously and reliably stabilized and distributed over the entire surface to be treated. On the other hand, varying and unpredestinable concentrations of discharges may appear. However, a homogeneously distributed discharge current is enforced, even with high voltages and field intensities, by the regular screen-shaped arrangement of the points of discharge. This also applies when the thickness of a foil, the surface of which has to be treated, is irregular or the surface not perfectly even.

Furthermore, the direction of the discharges to determined spots causes an elevated ionisation of the gases (generally air) which surround the surface to be treated and consequently decreases the electrical resistance over the entire length of the discharge. A complete break-down of the electrical resistance, and consequently a potential balance between the conducting elements and the opposing surface generally occurs at the points of discharge, viz at the ends of the conducting elements directed towards the surface to be treated. Therefore with the same expenditure of energy an elevated ion flux and consequently an elevated surface efficiency is to be attained.

The apparatus is particularly useful in the treatment of strip-shaped workpieces, e.g. foil or plastic material and especially of metal or aluminum, being led continuously past the conducting elements which are united with the electrode. Obviously the size of the electrode block has to correspond with the width of the strip. The second electrode, which is in direct contact with the strip, may have e.g. the shape of a rotatable drum over which the strip is led and opposite to which the electrode block is arranged. With an apparatus of this kind however, only one side of the strip can be treated. Treatment of both sides is possible if the apparatus consists of two similar electrode blocks and the strip passes between these two blocks.

The apparatus facilitates total discharges to occur at numerous, closely adjacent and precisely determined spots, the intensity of which may be chosen at a practically unlimited height. This permits a very high speed in the continuous treatment of strips.

Furthermore, the apparatus permits the surface treatment of other workpieces, even stationary ones. In the latter case a movement parallel to the surface to be treated has to be applied to the electrode block in order to secure the treatment of the entire surface.

Amplitude and frequency of the alternating voltage supplied to the electrodes may be chosen at will. For the treatment of a metal surface it is advantageous to choose an amplitude of such size that which each pulse of the voltage the gaseous medium (normally air) a total discharge takes place between the single conducting element and the opposing surface. A too small amplitude will effect only a corona discharge.

Specific disclosures

The attached drawings serve to explain the invention and show, as examples, several forms of the apparatus according thereto.

FIG. 1 is a longitudinal sectional view of one form of apparatus embodying the invention;

FIG. 2 is a cross sectional view thereof;

FIG. 3 is a view from below of the upper block of another form of apparatus;

FIG. 4 is a cross sectional view of the form of FIG. 3;

FIG. 5 is a side view of a third form of apparatus;

FIG. 6 is a plan view thereof;

FIG. 7 is a view from below the upper block of a fourth form;

FIG. 8 is a cross sectional view of the form of FIG. 7;

FIG. 9 is a view from below the upper block of a fifth form;

FIG. 10 is a longitudinal sectional view thereof;

FIG. 11 is a longitudinal sectional view of a sixth form;

FIG. 12 is a cross sectional view thereof;

FIG. 13 is a perspective view; and

FIG. 14 is a diagrammatic cross sectional view along line AB in FIG. 13 of an apparatus for the treatment of foil with the other electrode and the rollers indicated in plan.

According to FIGS. 1 and 2 the strip 1 to be treated passes over the drum 2 consisting of electrically conducting material and forming one of the electrodes. Opposite to the drum 2 at a distance from the surface of the strip to be treated the electrode block 3 is arranged. It consists of the electrode 4, the dielectric coating 5 made, e.g., from plastic material such as polyolefines, silicones or epoxy resins, and the conducting elements 6 which in this case take the form of metallic balls pressed into the surface of the dielectric coating facing the surface to be treated in a regular, screen-line order.

The drum 2 is grounded and the electrode 4 is connected to an alternating voltage generator (not shown). The electrode block 3 has approximately the same length as the drum 2 and is arranged parallel to its axis in such a way that the conducting elements all have the same distance from the surface to be treated. Instead of a drum a conducting slab, being in direct contact with the workpiece, may take the place of the counter-electrode.

The conducting elements may not necessarily be ball-shaped. Pins, as used in this case are particularly suitable as with an equal discharge current per element, the dielectric is stressed by a lower current density than when balls are used. The pins may have any cross sectional shape. The lower and upper electrodes, the latter in a block 3a may each have another shape as shown at 2a and 4a, each of which may be connected to one side of and an alternating current generator as above. In FIGS. 3 (view from below) and 4 (cross sectional view) the electrode 4a is a piece of a channel section closed at both ends and filled with dielectric material 5a. The conducting elements 6a have the shape of pins embedded in the dielectric material 5a positioned at right angles relative to the surface to be treated, the ends (preferably pointed) of which slightly protrude from the dielectric material.

The shape of the electrode, the length of the portion of the pins embedded in the dielectric and their distance from the parts of the electrode are by preference chosen in such a way that all the pins have a substantially equal capacity to the high voltage conducting terminal. The electrode may, for this purpose, be formed by a system of pins or rods connected to each other extending between the conducting elements which are in the shape of pins, but separated from the latter by the dielectric material.

The variant shown in FIGS. 5 (lateral view) and 6 (plan view) of the electrode block relates to an extension with pins 6b as conducting elements and with corresponding rods to form the electrode. The rods 16, however, are not fixed to the high voltage conducting terminal of the voltage generator. The latter is connected to a grounded contact piece 17. Slidable contact plugs 18 are situated therein which make optional contact with the rods 16. In this way it is possible to direct the current to that group of pins which is actually needed and to exclude certain portions of the surface from the treatment or to switch off those conducting elements which are not needed when treating a strip which is not so wide.

According to FIGS. 7 (view from below) and 8 (cross sectional view) the electrode 4c consists of a metal bar (preferably of a flat cross-section) which may be plain or corrugated. It is embedded in the dielectric material 5c and the pin-shaped conducting elements 6c are arranged at both sides of the metal bar in such a manner that their ends, facing the surface to be treated, extend beyond the metal bar and protrude from the dielectric. Connection of each one of electrodes 2c and 4c is had to a terminal of an alternating current generator (not shown).

A further form of the electrode block is shown in FIGS. 9 (view from below) and 10 (longitudinal section), consisting substantially of a metal block 4d forming the electrode and having numerous bore-holes arranged at regular distances. In the centre of each bore-hole is a conducting pin 6 which is insulated from the wall of the bore-hole by the dielectric material 5d. The metal block is connected to an alternating voltage generator the second pole of which is connected to the counter-electrode 2d. The ends of the bore-holes may either be open or blind, the latter being shown in the drawing. With the former open type the possibility exists for the pins 6d to protrude also at the rear of the metal block and to make use of these protrusions by attaching cooling fins in order to reinforce the cooling of the apparatus if, with intense treatment, heating of the pins should occur which could not be dissipated through the insulating material and the conducting block. This type is particularly useful in order to attain a high capacitive value between each pin and the high voltage pole of the voltage generator.

For the practical embodiment of the invention it should be particularly noted that between the high voltage pole and the conducting elements high potential difference occurs and that therefore only high quality insulating material has to be used in order to grant sufficient safety of operation and small mechanical size. The arrangement according to FIGS. 11 (longitudinal section) and 12 (cross section) is especially useful. There the internal conductors of bundled coaxial cable sections 7 take the place of the conducting elements 6e while the external conductors of these cable sections are, at both ends, sufficiently offset from the internal conductors that a flash-over between internal and external conductors does not occur. The external conductors are connected to each other and to the high voltage generator. The advantageous potential distribution resulting from this arrangement of the concentric conducting elements gives high dielectric strength with relatively thin walls. In order to avoid a flash-over and to attain mechanical strength of the entire arrangement, it is advantageous to embed the cable sections entirely in synthetic resin. In the present arrangement the first ends of the cable sections are directed towards the surface to be treated. The second ends of these cable sections have to be particularly well insulated in order to avoid corona discharge as a consequence of the needle effect, or the cable sections as shown in the drawing, are bent in such a way that both ends are directed towards the surface to be treated.

An arrangement is shown in FIGS. 13 and 14 for the treatment of only one surface of a foil. The foil 1f passes in a vertical direction over the guide pulleys 11 and has direct contact with the grounded electrode 2f, the latter consisting of a metal slab placed between the two guide pulleys 11. Opposite to the electrode 2f there is the housing 12 wherein several eletcrodes blocks 3f consisting of the electrode, the dielectric coating and the conducting elements embedded therein, are arranged side by side in such a manner that gaps 13 are left between the electrode blocks. The electrode blocks are connected to each other and collectively to the high voltage pole of the generator, the second pole of which is earthed.

A fan 14 is installed inside the housing 12 which blows air or an inert gas through the gaps 13 against the foil. Thereby a gas screen is formed separating the zone of electrical discharges from the other parts of the apparatus as printing or lacquering devices and prevents solvent vapours issuing from these devices. Through the conduit 15 air and ozone vapours issuing from the electrical discharges are removed by suction.

What I claim is:

1. Apparatus for a surface treatment of workpieces by electrical discharges between two electrodes each one being connected to a terminal of an alternating voltage generator in order to increase the adhesion of organic coatings applied after said treatment, one electrode being in direct contact with the work-iepce and the other electrode being arranged at a distance from the surface to be treated having a coating of a solid dielectric material stabilizing the discharges, numerous conducting elements being embedded in said dielectric coating, said elements having no conducting contact either with each other or with the electrode and having ends directed towards the surface to be treated wherefrom the discharges are issued, wherein numerous pins from conducting material forming the conducting elements and arranged at a regular distance from each other, are partially embedded in the dielectric coating and the ends of said pins directed towards the surface to be treated protrude from the dielectric coating, and wherein the shape of the electrode, the length of the portion of the pins embedded in the dielectric and their distance from the electrode is chosen in such a manner that all the pins have substantially the same capacity to the high voltage terminal.

2. Apparatus for a surface treatment of workpieces by electrical discharges between two electrodes each one being connected to a terminal of an alternating voltage generator in order to increase the adhesion of organic coatings applied after said treatment, one electrode being in direct contact with the work-piece and the other electrode being arranged at a distance from the surface to be treated having a coating of a solid dielectric material stabilizing the discharges, numerous conducting elements being embedded in said dielectric coating, said elements having no conducting contact either with each other or with the electrode and having ends directed towards the surface to be treated wherefrom the discharges are issued, wherein the electrode is a metal bar and wherein the conducting elements embedded in the solid dielectric coating are arranged at at least one of the flat sides of the metal bar whereby the ends of the conducting elements directed towards the surface to be treated protrude over the surface of the metal bar facing the surface to be treated.

References Cited

UNITED STATES PATENTS

| 2,087,915 | 7/1937 | Kimball | 317—2 |
|---|---|---|---|
| 2,163,294 | 6/1936 | Simons | 317—2 |
| 2,763,759 | 9/1956 | Mito et al. | 219—384 |
| 3,203,809 | 8/1965 | Visness | 250—49.5 X |
| 3,369,152 | 2/1968 | Spengler | 250—49.5 X |
| 3,370,200 | 2/1968 | Heyl et al. | 317—2 |
| 3,385,951 | 5/1968 | Bancroft et al. | 219—384 |
| 2,864,756 | 12/1958 | Rothacker | 117—47 X |
| 2,910,723 | 11/1959 | Traver | 117—47 X |
| 2,935,418 | 5/1960 | Berthold et al. | 117—47 X |

FOREIGN PATENTS

| 570,440 | 9/1958 | Belgium. |
|---|---|---|
| 637,793 | 5/1950 | Great Britain. |

VOLODYMYR Y. MAYEWSKY, Primary Examiner

U.S. Cl. X.R.

117—47; 219—383; 317—2, 309